2,929,705

PROCESS OF TREATING AMALGAMS OF METALS WHICH ARE DIFFICULTLY SOLUBLE IN MERCURY

Hans Hohn and Peter Gerassimoff, Vienna, Austria, assignors to Siemens & Halske Gesellschaft m.b.H., Vienna, Austria, a firm No Drawing. Application July 25, 1957
Serial No. 674,044

Claims priority, application Austria July 27, 1956

7 Claims. (Cl. 75—63)

This invention relates to a process of treating amalgams of metals which are difficultly soluble in mercury.

In this specification the term "metal" has the meaning "metals other than mercury" and the phrase "difficultly soluble" includes the meaning of "insoluble."

It is a main object of the invention to reduce the amount of energy required for the recovery of metals which are difficultly soluble in mercury from dilute amalgams.

It is another object of the invention to provide a process of conditioning a dilute amalgam of a metal which is difficultly soluble in mercury for separation of the mercury therefrom in the liquid phase to a concentration of said metal which was previously achievable only by distilling the mercury.

It is another object of the invention to provide an improved process of separating metals which are difficultly soluble in mercury from their amalgams by a superficial oxidation of said metals.

Other objects and advantages of the invention will become apparent as the specification proceeds.

In amalgam metallurgy, metallic mercury is used as an auxiliary substance in the recovery of metals. The amalgam-metallurgical recovery of such metals always proceeds in two stages. In the first stage the corresponding metal amalgams are formed, e.g., by direct electrolysis, by phase exchange reactions with less noble amalgams and the aqueous metal salt solutions, by the reduction of metal compounds with the aid of reducing amalgams, and by other methods. In the second stage the metal to be recovered must be separated from the mercury with which it is amalgamated. Metals which are difficulty soluble in mercury may preferably be recovered from their amalgams by distilling the readily volatile mercury. Although the latent heat of vaporization of mercury is small, a certain amount of energy can still be saved during the low-temperature distillation if amalgams of the highest possible concentration are subjected to distillation. The known amalgamating reactions generally give amalgams having concentrations of no more than between and two percent by weight. Amalgams containing % by weight of metals which are difficultly soluble in mercury have a highly viscous to pasty consistency. However, they may be enriched to a content of between 2 percent and, at most, 4–5 percent by weight of metal in mercury by simple known liquid-solid separation processes such as filtering, centrifuging, ferromagnetic separation. All these processes give a mercury which is almost free of metal and a stiff amalgam paste of butterlike consistency. No processes have been known before which enable a more effective separation with such simple means. Therefore, the material subjected to the previous known low-temperature distillation processes consisted always of amalgams of relatively low concentration, containing between 0.5% and 5% to a maximum of 10% by weight of metal. By way of example it may be stated that a 1% iron amalgam obtained by direct electrolysis could not be enriched by filtration to an iron content of more than 8–9 percent iron even under very high pressures (70 kg./sq. cm.). This 8–9% iron amalgam has already a friable consistency and is no longer capable of flowing.

It is also known that amalgams having a small content of metals which are very difficultly soluble in mercury can be aged to some degree by prolonged storage. Enriched amalgams containing up to as much as 5–10% metal can then be obtained by filtering aged amalgams. More highly enriched amalgams obtained without distillation of the mercury have not been disclosed so far. It has already been disclosed to age amalgams at an elevated temperature in order to facilitate the floating of the metal particles that are insoluble in mercury. This measure, however, does not lead to a further enriching of the metal in the amalgam.

Surprisingly it has been found that the heating preferably above 450° C., under a pressure which is equal to or higher than the vapor pressure of the mercury corresponding to this temperature, whereby an evaporation of the mercury is prevented, results in such a coarsening of the grains of the metal which is difficultly soluble in the mercury that highly concentrated amalgams result from the subsequent separation of the major portion of the liquid mercury by known methods, e.g. by filtration. These metal amalgams contain 15–50% metal. If the starting amalgam was heated under pressure above 450° C. they will contain in almost all cases more than 25% metal. The residual mercury may be removed in a manner known per se by distillation. This process step alone enables a saving of 50–90% of the energy used for low-temperature distillation. The superatmospheric pressure required during the heat treatment of the amalgam may be produced by heating the amalgam above the boiling point of mercury in a pressure-tight chamber so that the heated amalgam is subjected to the vapor pressure of the mercury. If the heat treatment is carried out in a continuous operation the incoming and outgoing amalgams may be subjected to counterflow heat exchange with each other for preheating the incoming amalgam and cooling the outgoing amalgam. In this case the heat-treating chamber may be sealed with liquid amalgam at the feed and discharge ends. The process according to the invention may be illustrated by the following examples:

Example 1

Iron amalgam containing 0.3% iron was heated for five minutes under pressure at 550° C., and filtered after cooling. The filtration residue contained 32% iron whereas the mercury filtrate was free of iron. The filtration residue had the same consistency (butterlike paste) as iron amlagam obtained after filtration with an iron content of 3% if the starting amalgam had not been heat-treated under pressure.

Example 2

Nickel amalgam containing 4% nickel was heated under pressure for five minutes at 550° C. Filtration after cooling gave a pasty filtration residue containing 31% nickel.

Example 3

The same nickel amalgam as in Example 2 was treated for one hour at 440° C. Filtration at room temperature gave a residue containing 20% nickel and having almost the same consistency as that obtained in Example 2.

Example 4

Copper amalgam containing 3.5% copper was treated for 15 minutes at 530° C. The filtration residue contained 30% copper.

Example 5

A manganese amalgam containing 1.8 percent by weight of manganese was treated at 560° C. and filtered in the cold. The filtration residue contained only 11% manganese.

Example 6

The same manganese amalgam as in Example 5 was heated at 560° C. and filtered at 280° C., at a temperature below the boiling point of mercury. The filtration residue contained 35 percent manganese.

The application of higher temperatures during the heat treatment may increase the concentration of metal in the filtration residue to as much as 50 percent. In practice, however, 600° C. will be greatly exceeded because the vapor pressure of mercury increases with temperature to such a degree that its control under commercial conditions becomes difficult.

The present invention includes an additional important feature which consists in enriching the metal content of amalgams by oxidation. The effect described is most easily observed with chromium amalgam which will separate into a gray chromium powder and chromium-free mercury after a short period of standing on the air. Iron amalgam must be allowed to stand in the air for several days or even weeks to effect this separation. The iron which has been separated in this way from the mercury with which it had been amalgamated has already been investigated. It was found to consist of metallic iron having an radiologically amorphous oxide layer or oxygen covering layer, which eliminates the wettability of these iron particles by mercury. Previous attempts to commercially utilize this effect for the removal of mercury from metal amalgams have remained without any practical success because this separation is not completed even within a very long time, particularly with those amalgams which are of commercial interest (amalgams of iron, nickel, manganese, copper and others).

Surprisingly it has been found that the amalgams which have been enriched according to the invention by filtering dilute amalgams after a heat treatment, are under certain conditions particularly suitable for oxidative separation. It has been found that this oxidative separation of amalgams which had been treated at elevated temperature under pressure will occur particularly quickly and completely if the mercury contains in solution a small amount of a metal which has a higher affinity to oxygen than the metal to be recovered from the amalgam. For the effect of the oxidative separation it is of minor importance whether this metal of higher affinity to oxygen is added to the mercury before the pressure treatment or after the pressure treatment before the oxidation. Aluminum, e.g., has proved particularly suitable as an addition to pressure-enriched amalgams to promote their oxidative separation. It has been found that an addition of $10^{-4}$ to $10^{-2}$ percent by weight of aluminum, related to the mercury, has a particularly desirable effect. An addition of manganese in an order of $10^{-3}$ to $10^{-1}$ percent by weight is also suitable. Manganese is preferably incorporated in the amalgam by a direct electrolysis of a manganese-containing iron salt solution. To incorporate aluminum, it may be dissolved in mercury at elevated temperatures or may be added to the mercury before the heat treatment under pressure. It has been found that the separation depends to a high degree on the residence time of the amalgam in the pressurized heat-treating zone after an addition of aluminum. The following example illustrates the enriching effect on iron amalgams to which traces of aluminum had been added before the heat treatment:

Example 7

Iron amalgam having an iron content of 2.5% was treated for ten minutes at 550° C. under pressure and was then filtered. A separation to as much as 60 percent by weight of metal was possible on the filter.

Example 8

When the same iron amalgam as in Example 7 was heat-treated for two hours, it was possible to enrich it by filtration only to as much as 60 percent by weight of metal.

Example 9

When the same amalgam as in Examples 7 and 8 was heat-treated for four hours, it was possible to enrich it by filtration only to as much as 40 percent by weight of metal.

Example 10

When the same amalgam as in Examples 7 to 9 was heat-treated for five hours, it was possible to enrich it by filtration only to as much as 32 percent by weight of metal. A separation into iron powder and iron-free mercury was not effected.

This behavior may be due to a reaction of the mercury-dissolved aluminum with the iron during the heat treatment. When the aluminum has been combined with the iron which is dispersed in the mercury it is no longer available for conveying oxygen through the mercury to the iron particles to effect the oxidative separation. It has been found satisfactory, therefore, to add the oxygen transmitting agent to the mercury after the pressure treatment. To this end, aluminum may be dissolved in mercury at 500° C. and the resulting aluminum amalgam may be admixed in the cold to the pressure-treated iron amalgam.

The metal powder obtained by oxidative separation is not actually oxidized but has only a oxygen covering on the several metal grains. It is suitable as a starting product for sintered bodies.

What is claimed is:

1. A process of recovering a metal which is difficulty soluble in mercury from an amalgam containing said metal in the form of distinct solid grains by adding to said amalgam a metal which has a higher affinity to oxygen than said difficulty soluble metal and which is at least partly soluble in mercury, then separating mercury in the liquid phase from said amalgam to form a residual amalgam enriched with said difficultly soluble metal, allowing said difficultly soluble metal in said residual amalgam to oxidize to obtain an oxide-covered amalgam powder and mercury which is substantially free of said difficultly soluble metal, and separating said amalgam powder from said mercury.

2. A process of recovering a metal which is difficultly soluble in mercury from an amalgam by adding to said amalgam a metal which has a higher affinity to oxygen than said difficultly soluble metal and which is at least partly soluble in mercury, then heating said amalgam above 360° C. at a pressure sufficient to keep the mercury liquid and then separating mercury in the liquid phase from said amalgam enriched with said difficultly soluble metal, allowing said difficultly soluble metal in said residual amalgam to oxidize to obtain an oxide-covered amalgam powder and mercury which is substantially free of said difficultly soluble metal, and separating said amalgam powder from said mercury.

3. In a process of recovering a metal which is difficultly soluble in mercury from an amalgam by heating said amalgam above 360° at a pressure sufficient to keep the mercury liquid, the improved step consisting in adding thereafter to said amalgam a metal which has a higher affinity to oxygen than said difficultly soluble metal and which is at least partly soluble in mercury, then separating mercury in the liquid phase from said amalgam enriched with said difficultly soluble metal, allowing said difficultly soluble metal in said residual amalgam to oxidize to obtain an oxide-covered amalgam powder and mercury which is substantially free of said difficultly soluble metal, and separating said amalgam powder from said mercury.

4. In a process of recovering a metal which is difficultly soluble in mercury from an amalgam by heating said amalgam above 360° C. at a pressure sufficient to keep the mercury liquid, then separating mercury in the liquid phase from said amalgam to form a residual amalgam enriched with said difficultly soluble metal, the improved step consisting of adding thereafter to said residual amalgam a metal which has a higher affinity to oxygen than said difficultly soluble metal and which is at least partly soluble in mercury, allowing said difficultly soluble metal in said residual amalgam to oxidize to obtain an oxide-covered amalgam powder and mercury which is substantially free of said difficultly soluble metal, and separating said amalgam powder from said mercury.

5. A process as set forth in claim 1, in which said metal of higher affinity consists of aluminum and is added in an amount of $10^{-4}$ to $10^{-2}$ percent by weight related to the mercury contained in said amalgam.

6. A process as set forth in claim 1, in which said metal of higher affinity consists of manganese and is added in an amount of $10^{-3}$ to $10^{-1}$ percent by weight related to the mercury contained in said amalgam.

7. A process as set forth in claim 1, in which mercury is distilled from said separated amalgam powder.

References Cited in the file of this patent

UNITED STATES PATENTS 2,758,921    Schmidt _____ Aug. 14, 1956

FOREIGN PATENTS 502,939    Canada _____ May 25, 1954